(12) United States Patent
Sack

(10) Patent No.: US 8,327,757 B1
(45) Date of Patent: Dec. 11, 2012

(54) WAFFLE BAKER

(76) Inventor: Winifred R. Sack, Brighton, CO (US)

( * ) Notice: Subject to any disclaimer, the term of this patent is extended or adjusted under 35 U.S.C. 154(b) by 516 days.

(21) Appl. No.: 12/221,969

(22) Filed: Aug. 9, 2008

Related U.S. Application Data

(60) Provisional application No. 60/964,191, filed on Aug. 9, 2007.

(51) Int. Cl.
*A47J 37/06* (2006.01)
(52) U.S. Cl. .......................... 99/372; 206/278
(58) Field of Classification Search ................ 219/401, 219/392, 394, 725, 730, 732, 405, 403, 450.1; 99/340, 403, 377, 349, 353, 372, 426, 448, 99/428, 449, 439; 206/278, 292, 511, 294, 206/461, 464, 467, 470, 471, 509, 503, 512
See application file for complete search history.

(56) References Cited

U.S. PATENT DOCUMENTS

| | | |
|---|---|---|
| 246,194 A | 8/1881 | Patton |
| 2,116,688 A | 4/1937 | Ratliff |
| 4,361,082 A | 11/1982 | Haas et al. |
| 4,803,918 A | 2/1989 | Carbon et al. |
| 4,967,650 A | 11/1990 | Weigle |
| 5,142,967 A | 9/1992 | Herting |
| 5,465,654 A | 11/1995 | Lampi et al. |
| 6,505,809 B1 | 1/2003 | Reed |
| 6,644,472 B2 * | 11/2003 | Coppedge et al. ............ 206/278 |
| 6,860,191 B2 | 3/2005 | Jackson et al. |
| 7,201,358 B2 | 4/2007 | Nichols et al. |
| 7,638,740 B1 * | 12/2009 | Hradecky ...................... 219/524 |
| 2002/0073855 A1 | 6/2002 | Gambino et al. |
| 2004/0089162 A1 | 5/2004 | Lorence et al. |
| 2004/0094043 A1 | 5/2004 | Morgan |
| 2004/0265453 A1 | 12/2004 | Helou et al. |
| 2005/0084580 A1 | 4/2005 | Jones et al. |
| 2005/0242009 A1 | 11/2005 | Berryhill |
| 2006/0049169 A1 * | 3/2006 | Li ............................... 219/450.1 |
| 2006/0283334 A1 * | 12/2006 | Ho ................................. 99/372 |
| 2007/0199555 A1 * | 8/2007 | Gregory ........................ 126/9 R |

* cited by examiner

*Primary Examiner* — Henry Yuen
*Assistant Examiner* — Phuong Nguyen
(74) *Attorney, Agent, or Firm* — Rod D. Baker

(57) ABSTRACT

A waffle iron apparatus and method for use. A waffle iron apparatus that permits many waffles to be baked simultaneously in a conventional residential kitchen oven. The apparatus has two gridiron assemblies, which are pivotally connected, but which also may be fully and easily disconnected for cleaning. Multiple apparatuses are easily and neatly stackable for storage.

3 Claims, 22 Drawing Sheets

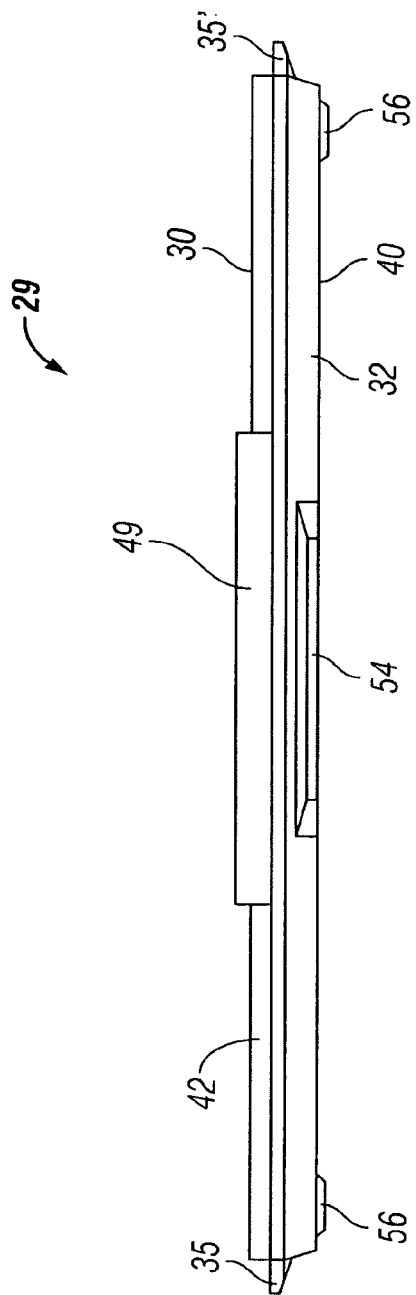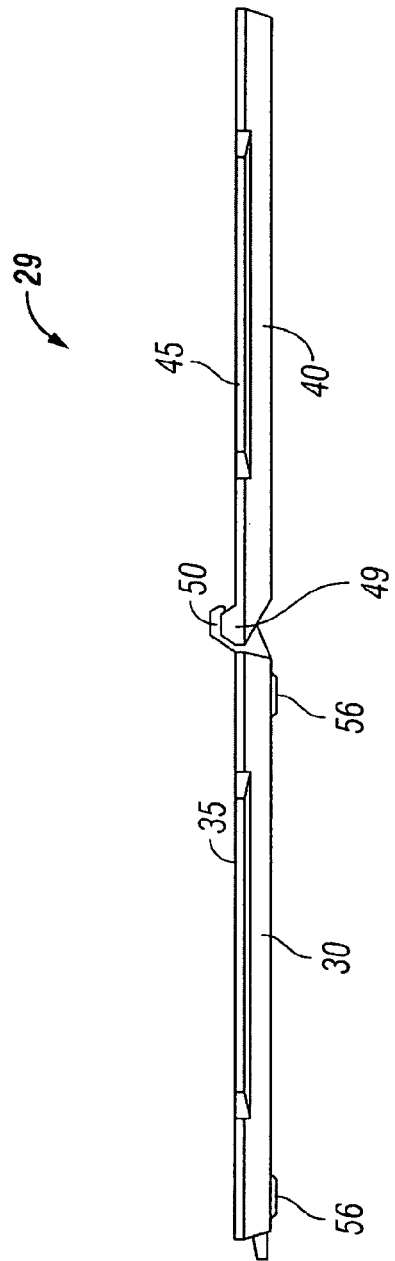

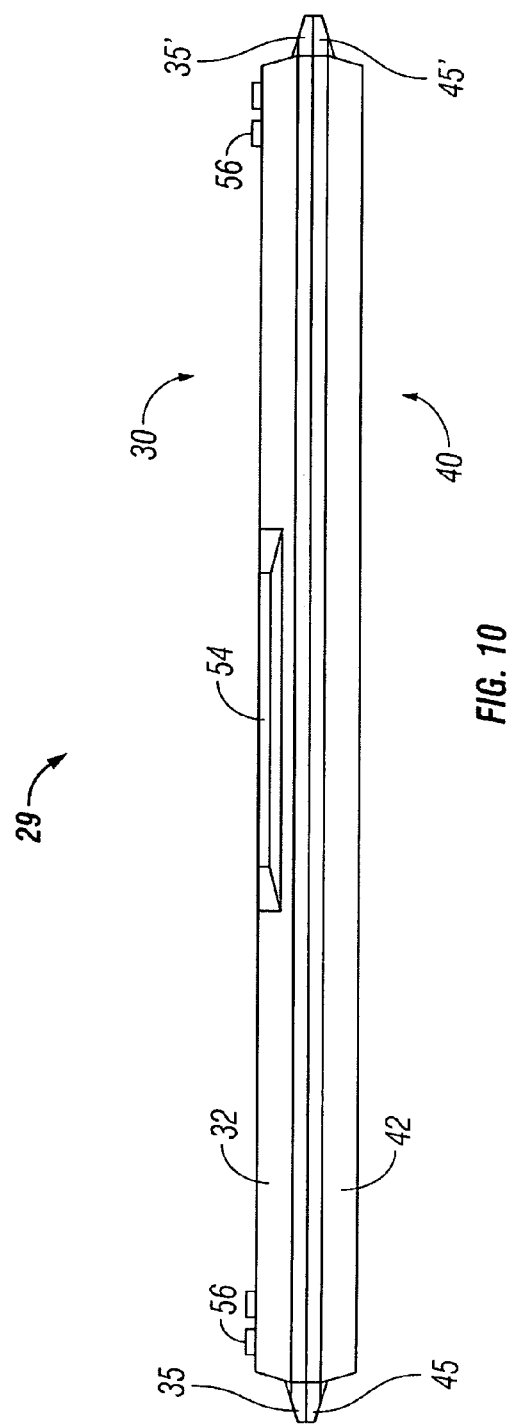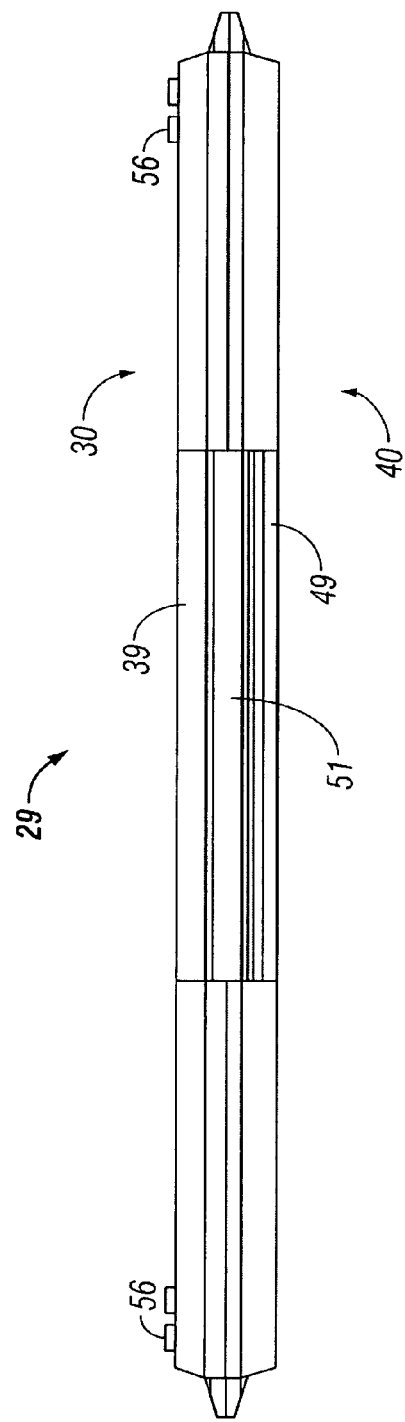

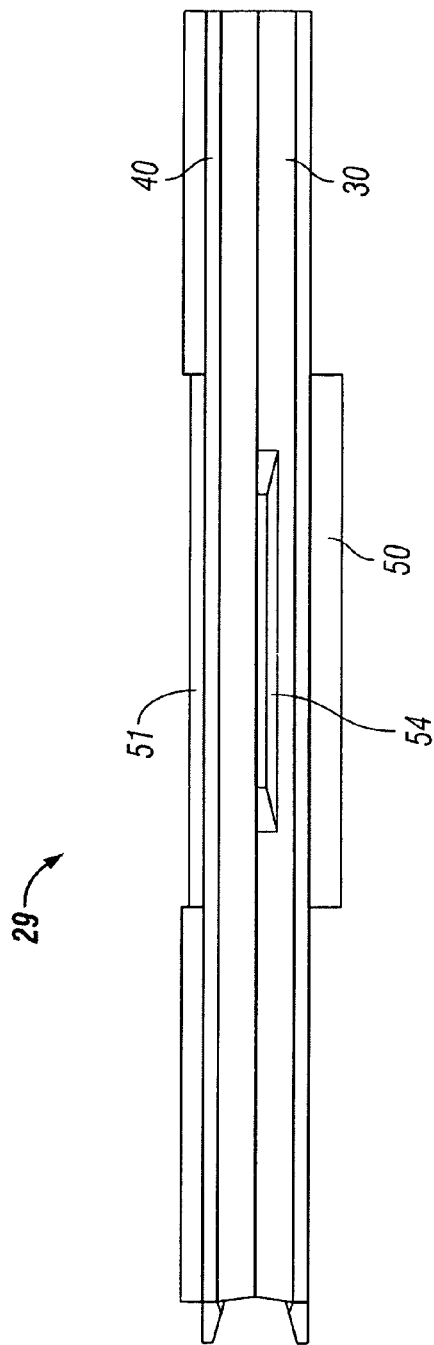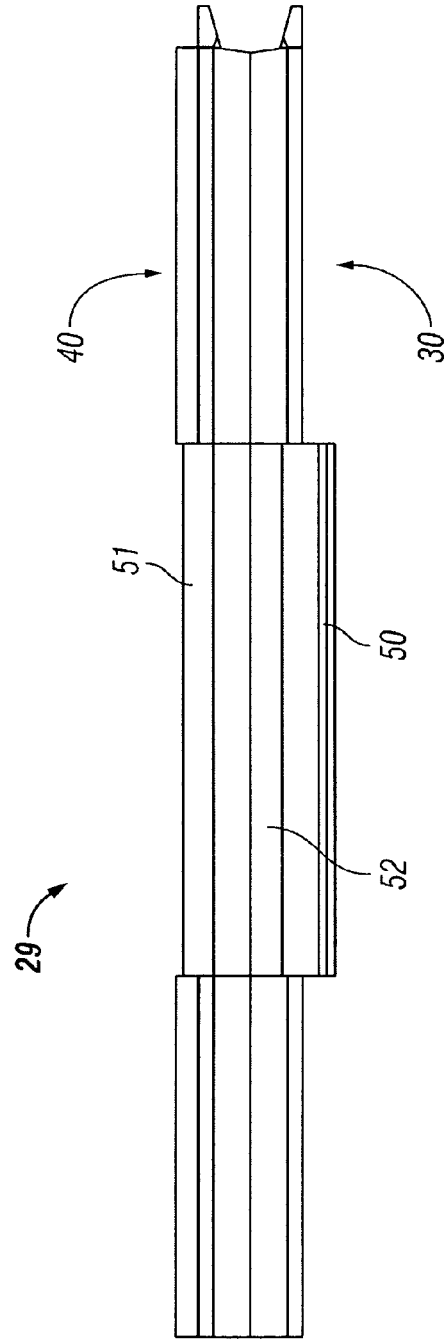

WAFFLE BAKER

CROSS-REFERENCE TO RELATED APPLICATIONS

This application claims the benefit of the filing of U.S. Provisional Patent Application Ser. No. 60/964,191, entitled Stackable Waffle Iron, filed on Aug. 9, 2007.

BACKGROUND OF THE INVENTION

1. Field of the Invention (Technical Field)

The present invention relates to appliances for baking foods, particularly appliances for baking waffles and the like, and specifically to a stackable waffle iron apparatus for use within a conventional residential kitchen oven.

2. Background Art

Waffle irons have been known for decades. In the function and use of a typical waffle iron, a top gridiron component is placed in parallel confronting relation with a bottom gridiron, with a food batter (or other food item) pressed between the gridirons. The parallel gridirons are then heated to bake the batter to a finished food item, such as a waffle. The gridirons may be heated internally, as by electrically resistive coils, or the entire waffle iron apparatus may be placed in an oven for baking. Many known waffle irons have the two gridirons pivotally connected together, such that the two gridiron components are always connected, but can be swung between an open position where the components are substantially separated, and a closed position for baking in which the gridirons are situated substantially adjacent and parallel.

U.S. Patent Application Publication No. 2006/0283334 to Ho has to do with a waffle iron device that has a pair of iron plates between which a griddle element may be inserted.

U.S. Patent Application Publication No. 2004/0094043 to Morgan discloses dome mold baking assemblies having a pair of baking sheets, with one sheet seating on top the other for baking a batter between the sheets.

U.S. Patent Application Publication No. 2004/0089162 to Lorence et al. seems to disclose a type of stackable muffin pan.

U.S. Patent Application Publication No. 2002/0073855 to Gambino et al. appears to disclose a waffle iron with specialized inter-lockable gridirons.

U.S. Pat. No. 5,465,654 to Lampi, et al, discloses a flanged pan with a flanged lid connected thereto by a hinge, to permit foods to be cooked in quantity in a convection oven. A system is disclosed for vertically stacking a plurality of the pans.

U.S. Pat. No. 5,142,967 to Herting appears to teach a method of making a waffle in a press having closeable top and bottom halves; the entire press can be put in an oven to bake the waffle.

U.S. Pat. No. 4,967,650 to Weigle teaches a type of dual-level waffle baking appliance.

U.S. Pat. No. 4,803,918 to Carbon, deceased et al. discloses a double baker for waffles, having a pair of outer shell members hinge-connected to a double-faced single inner shell member.

U.S. Pat. No. 2,116,688 is for another type of dual-level waffle iron.

However, the waffle irons known in the art are limited in their utility in that the pair of gridirons is pivotally but permanently connected, which reduces versatility and may inhibit effective cleaning. Alternatively, other known devices may have mutually detachable gridirons, but which are configured in manners which prevent stacked storage.

Moreover, most frequently encountered home-use waffle irons are electrically powered for heating, and devised for use upon a kitchen countertop. A common drawback to most electric waffle irons is limited waffle production; the appliance bakes one to four waffle servings at a time. Thus, when a family or other group of more than just one or two individuals gathers for a breakfast or other meal, the group often must wait while waffles are consecutively baked in a series of productions. This may be undesirable if the preference of the group is to eat together a complete meal of fresh, hot, waffles without having to wait for serial production of waffle servings from a small electric appliance.

Against the foregoing background, the present invention was developed.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3 is a rear view of the apparatus seen in FIGS. 1 and 2;

FIG. 4 is a left side elevation view of the apparatus seen in FIGS. 1 and 2;

FIG. 10 is a front view of the apparatus seen in FIG. 9, in the closed position;

FIG. 11 is a rear view of the apparatus seen in FIGS. 9 and 10, in the closed position;

FIG. 24 is a front view of the apparatus seen in FIGS. 18 and 19;

FIG. 25 is a rear view of the apparatus seen in FIGS. 18 and 19;

Like label numerals are used to denote like elements in all the figures.

DESCRIPTION OF THE PREFERRED EMBODIMENTS

Figure 1:
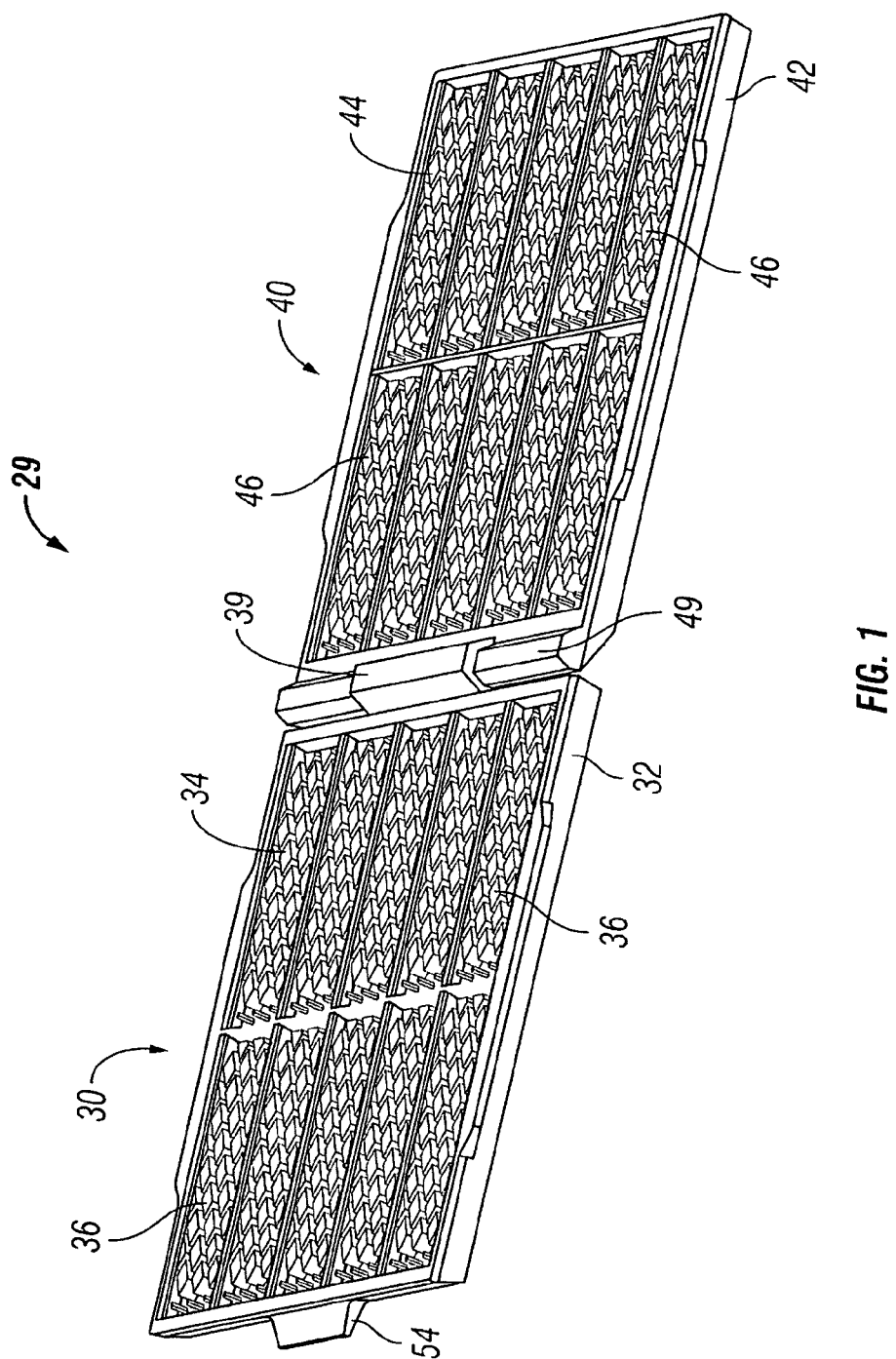
FIG. 1 is a left side perspective view of an apparatus according to the present disclosure, shown from above and in an open position.

Best Modes for Carrying Out the Invention

I disclose herein a simple but elegant waffle iron apparatus which is versatile, configured to be easily cleaned, and conveniently stackable for storage. Further, the apparatus permits a relatively large number of waffle servings to be baked simultaneously in the oven of a conventional residential kitchen.

In this disclosure, a "waffle" includes typical breakfast waffles, as well as other confectionaries or even pancakes commonly produced by baking a smooth, possibly sweetened batter. One "waffle" is a single ordinary serving, while "waffles" means multiple servings for consumption by one or more individuals.

The appliance according to the present disclosure permits the user to generate relatively large numbers of waffles simultaneously, so that a batch of eight or more fully-baked waffles emerges from the oven at the same time. This is in distinction from electric waffle irons commonly encountered in the art, whereby waffles are produced a few (e.g., one to four) servings at a time. The apparatus may be manufactured from materials known in the field of waffle iron manufacture. The contours and configuration of the present apparatus, however, offer advantages over similar and related devices known in the prior art.

The apparatus according to this disclosure can be placed into either an open or closed position. The apparatus has two main assemblies, a first or upper gridiron assembly and a second or lower gridiron assembly. Each of the two gridiron assemblies has hinge knuckle features along a back edge, whereby the two assemblies may be pivotally yet detachably interconnected. The two assemblies may be hingeably connected so that the assemblies may be swung apart to permit batter to be deposited on a lower griddle surface, and then swung back together to press the batter between the upper and lower waffle-textured griddle surfaces.

An advantage of the apparatus is that a greater plurality of waffles, e.g., ten, are produced from a batter baked between the griddle surfaces. Because the appliance according to the present disclosure is placed in an oven, the full complement of waffles is produced for concurrent consumption. Thus, in a preferred embodiment, the upper and lower griddle surfaces each are approximately twelve inches (30.5 cm) wide by sixteen inches (40.5 cm) long, approximately the size of a standard cookie baking sheet. A single apparatus in the closed position may be, for example, about 2.5 inches (6.4 cm) to about 4.5 inches (11.4) high. The apparatus thus fits readily upon a baking rack of a typical residential kitchen oven.

An advantageous feature of the apparatus is that it is configured for easy stacked storage. The gridiron assemblies are configured with complementary cleats and indents. The cleats of one assembly are shaped and sized for engagement into and within the indents of a second assembly. Two or more of the apparatuses according to this disclosure, and in closed positions, may thus be stacked one above the other with the cleats on the bottom of an upper apparatus engaged with the indents on the top of a lower apparatus, so that stacking is orderly and secure.

Another advantage of the apparatus is that the two gridiron assemblies are detachable at their hinge knuckles; both assemblies alternatively may then be "flipped" for stacking; i.e., both assemblies are inverted to turn the waffle iron apparatus "inside out." In the inside-out position, the housing surfaces of the two assemblies may be placed in flush contact for stacking, with the two waffle-textured griddle surfaces facing away from each other to define the "bottom" and "top" surfaces of the waffle iron, as described herein.

As seen in FIGS. 1-7, a stackable waffle iron apparatus 29 includes a first gridiron assembly 30 and a second gridiron assembly 40. Each assembly 30, 40 have a housing 32 and 42, respectively, which is coupled with a first waffle-textured gridiron 34 and a second waffle-textured gridiron 44. The gridirons 34, 44 are composed of cast iron or metal alloys known in the art of griddle-making. The housings 32, 42 are fabricated from aluminum alloy or other suitable, rigid, high-temperature (e.g. 750° F.) material. The housings 32, 42 preferably are shaped and configured as seen in the figures. The gridirons 34, 44 manifest any of a wide variety of known or yet-to-be designed corrugated, or waffle-shaped, surface pattern textures suitable for press-forming waffles. It will be understood, however, that flat, non-textured grills may be used in lieu of waffle-textured gridirons without departing from the scope of this invention.

Figure 2:
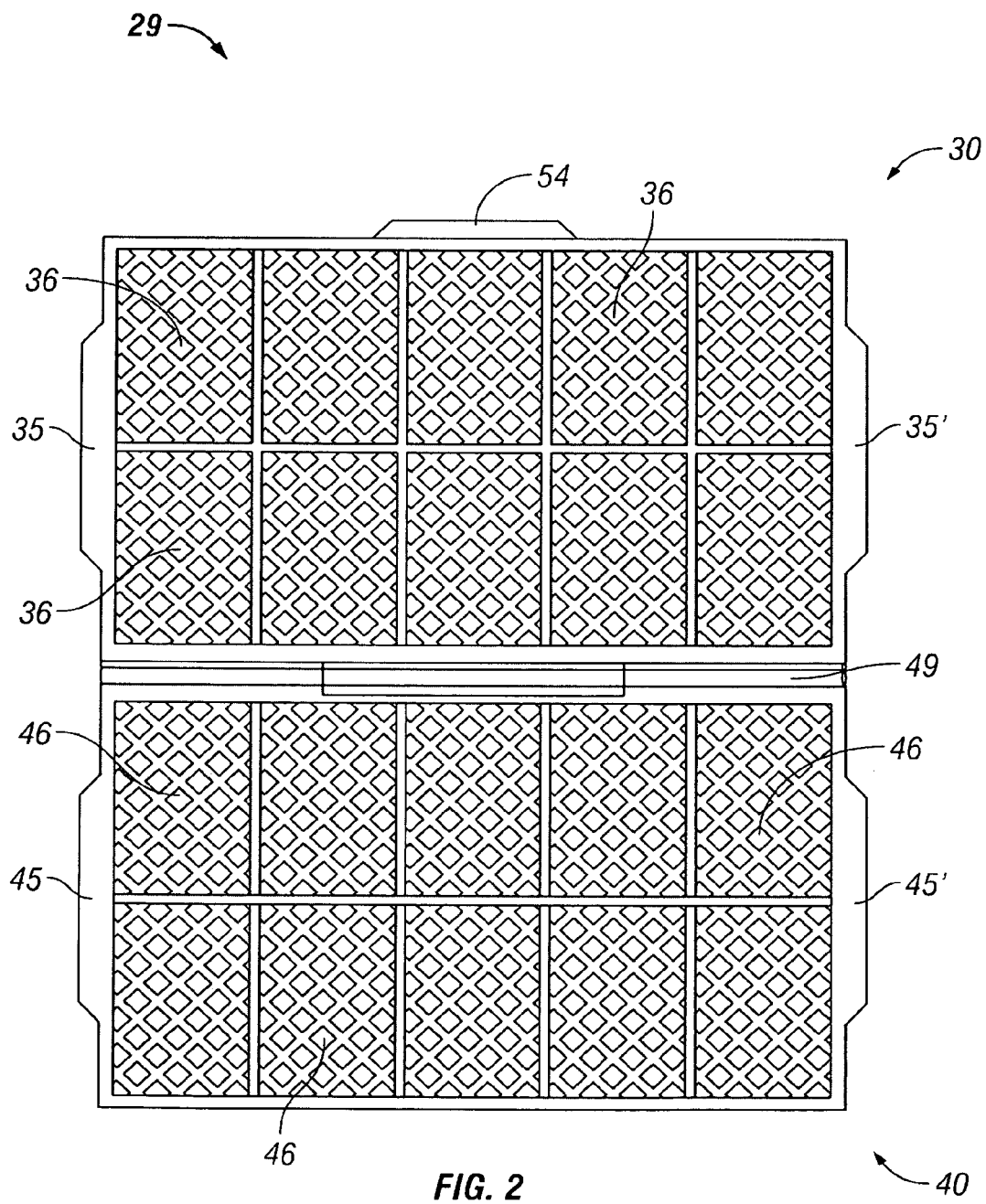
FIG. 2 is a plan view from above of the apparatus seen in FIG. 1, in the open position.
Figure 5:
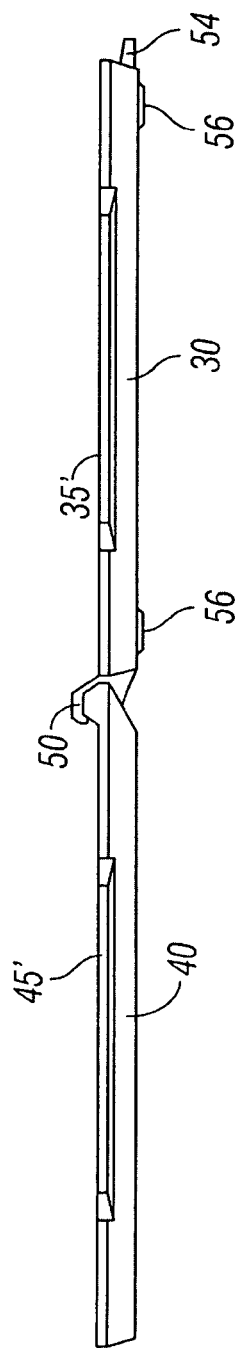
FIG. 5 is a right side elevation view of the apparatus seen in FIGS. 1 and 2.
Figure 6:
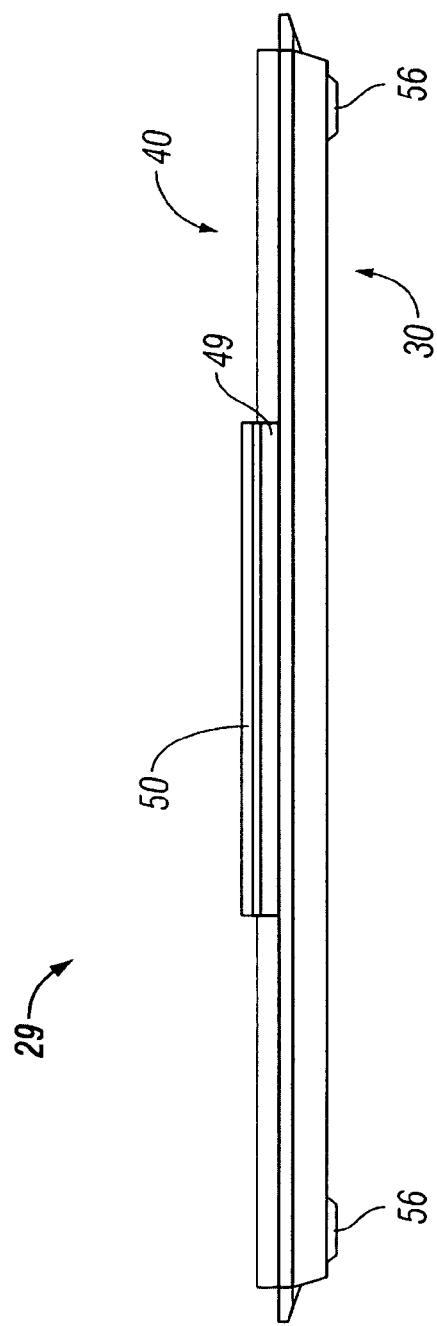
FIG. 6 is a front view of the apparatus seen in FIGS. 1 and 2.

Significantly, and as best seen in FIGS. 1 and 2, each gridiron 34 or 44 has a plurality of waffle forms 36, 46 defined thereon. A waffle form is a portion (e.g. rectangular portion) of the gridiron 34 or 44 devised and configured to be the mold for a single waffle. Thus, the gridirons 34, 44 are configured such that when the batter has been fully baked there-between, the sheet of baked batter is readily broken into a plurality of individual waffles, according to the definition imposed by the gridirons. In the embodiment illustrated, the gridirons 34 and 44 are configured to generate ten waffles, per the defined array of ten waffle forms 36 in the first gridiron 34, which forms 36 are complementary to an equal number of waffle forms 46 in the second gridiron 44. Thus the gridiron arrays correspond, and the waffle forms 36 in the first are equal in size and number, and are alignable with, the waffle forms 46 in the second. Notably, the preferred embodiment of the present apparatus has at least eight waffle forms 36 or 46 on each gridiron. This is in contrast to most known waffle irons, which have only one to four waffle forms per gridiron.

FIGS. 1-7 and 12-13 show that the first and second gridiron assemblies 30, 40 have at their respective back edges complementary, inter-engageable hinge knuckle elements 39, 49.

These knuckle elements include a curved flange 50 (FIGS. 4-6, 15, 18, 20, 23, 26) engageable around a hinge pin or rod or 51 (FIGS. 11, 14, 18, 19, 21, 24, 26). The curved flange 50, which may be upon the first assembly 30, is insertable into a slot 52 (FIG. 14, 16, 19, 20, 25) defined adjacent the rod 51 in the hinge portion 49 of the second assembly 40, so that with the flange 50 so inserted, the assemblies may be swung together to wrap the flange 50 partially around the pin 51 to link together, as by a hinge, the rear ends of the assemblies. The two assemblies 30, 40 can be mutually disengaged by simply pivoting them apart into an "open" position, and separating the flange 50 from around the pin 51 by withdrawing the flange from the slot 52 in the second assembly's hinge portion 49. Thus easily disengaged, the assemblies can be completely disconnected from one another.

As seen in FIGS. 1-3, 5, 7, 10, 12-15, 17, and 20-24, the first gridiron assembly 30 may have a front lift handle 54 integrated therewith or mounted thereto for convenience in manipulating the first assembly, including pivoting the assembly 30 in relation to the second gridiron assembly 40. The lift handle 54 is particularly useful when the gridirons 34, 44 are hot (upon removing the apparatus 29 from the oven). Both or either the gridiron assemblies 30, 40 may also feature side grip handles 35, 35' and 45, 45' respectively, as best seen in FIGS. 2-5 and 9-16 for convenience, comfort, and ease of handling the assemblies 30, 40. Each assembly 30 or 40 may have a grip handle on one or both of its sides.

Figure 9:
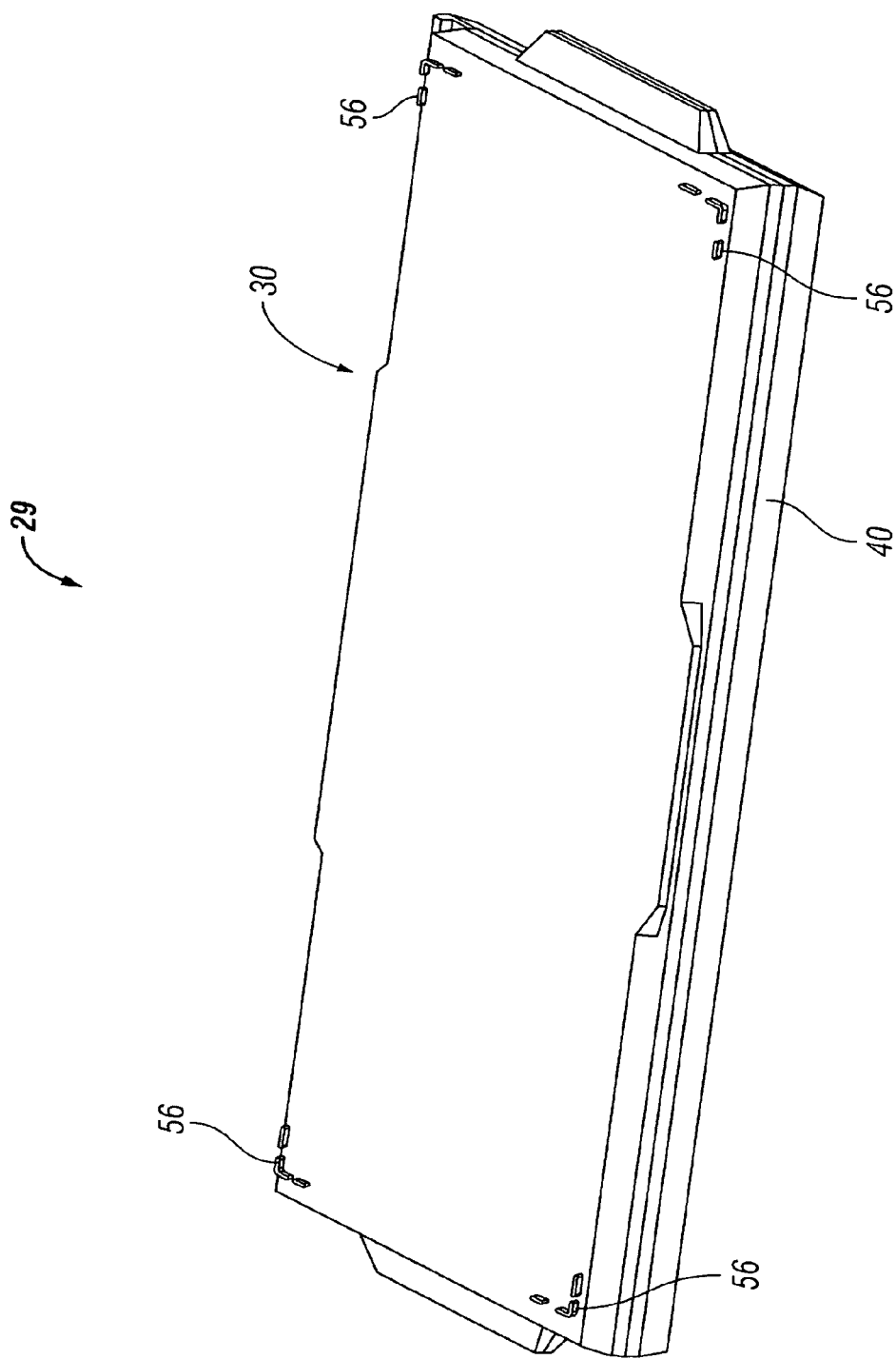
FIG. 9 is a front perspective view, from above, of an apparatus according to the present disclosure, shown in the closed position.
Figure 12:
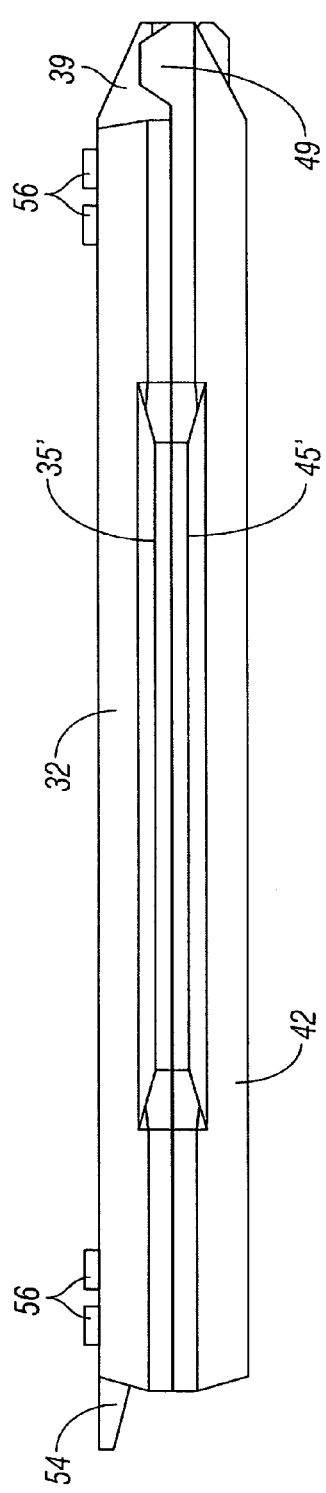
FIG. 12 is a right side elevation view of the apparatus seen in FIGS. 9 and 10.
Figure 13:
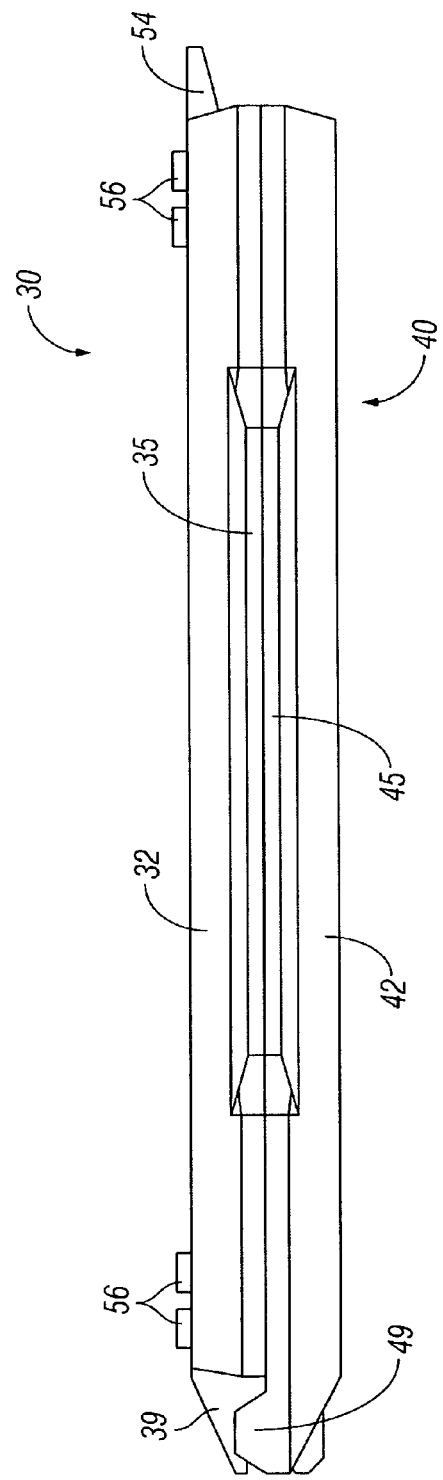
FIG. 13 is a left side elevation view of the apparatus seen in FIGS. 9 and 10.
Figure 15:
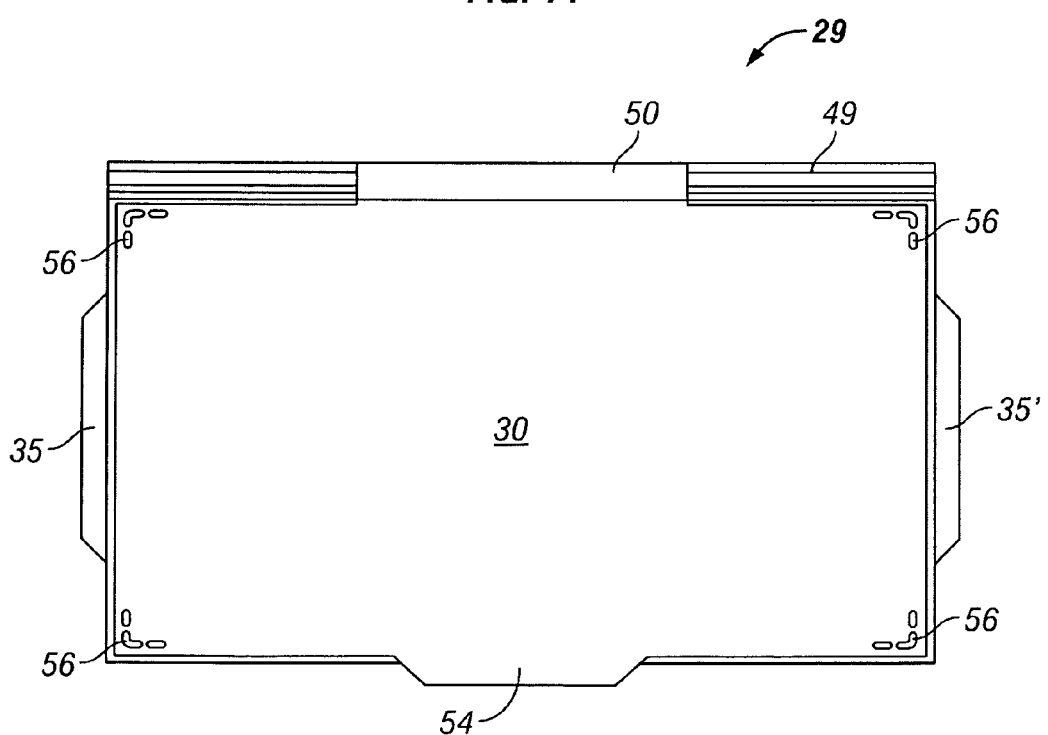
FIG. 15 is a top plan view of the apparatus seen in FIGS. 9 and 10.
Figure 16:
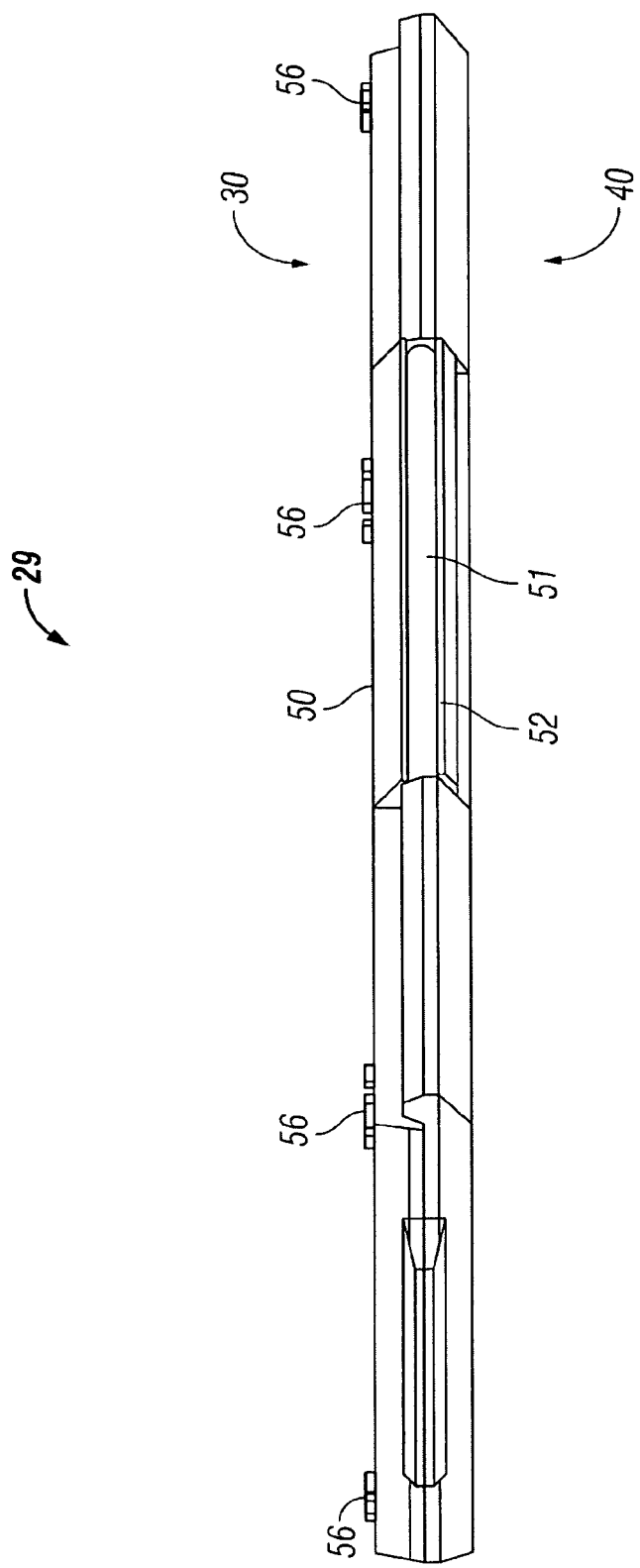
FIG. 16 is a perspective view of the right side back corner of the apparatus seen in FIGS. 9 and 10.
Figure 17:
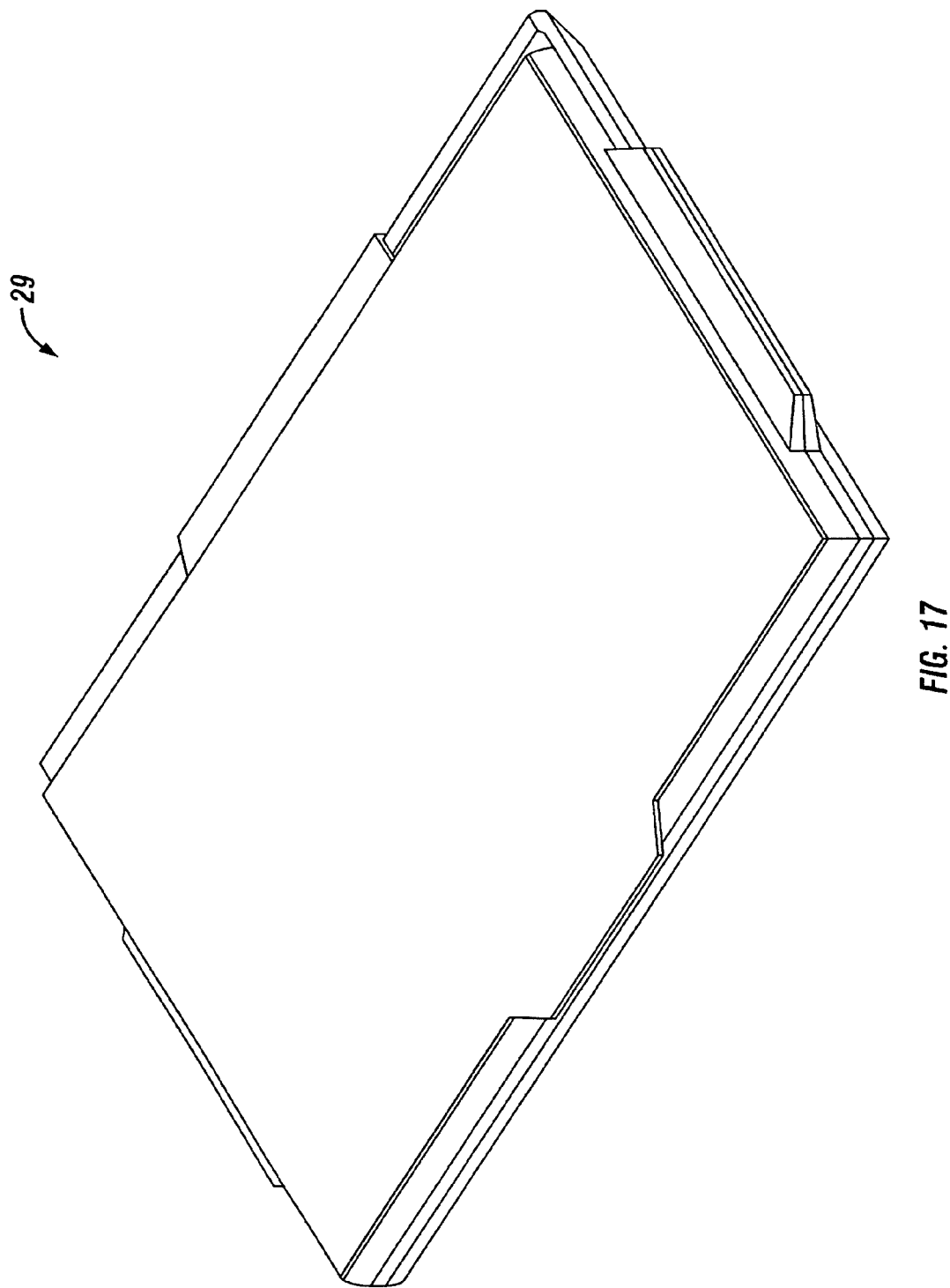
FIG. 17 is a perspective view front the front and above of the apparatus according to the present disclosure, shown in a closed position.
Figure 18:
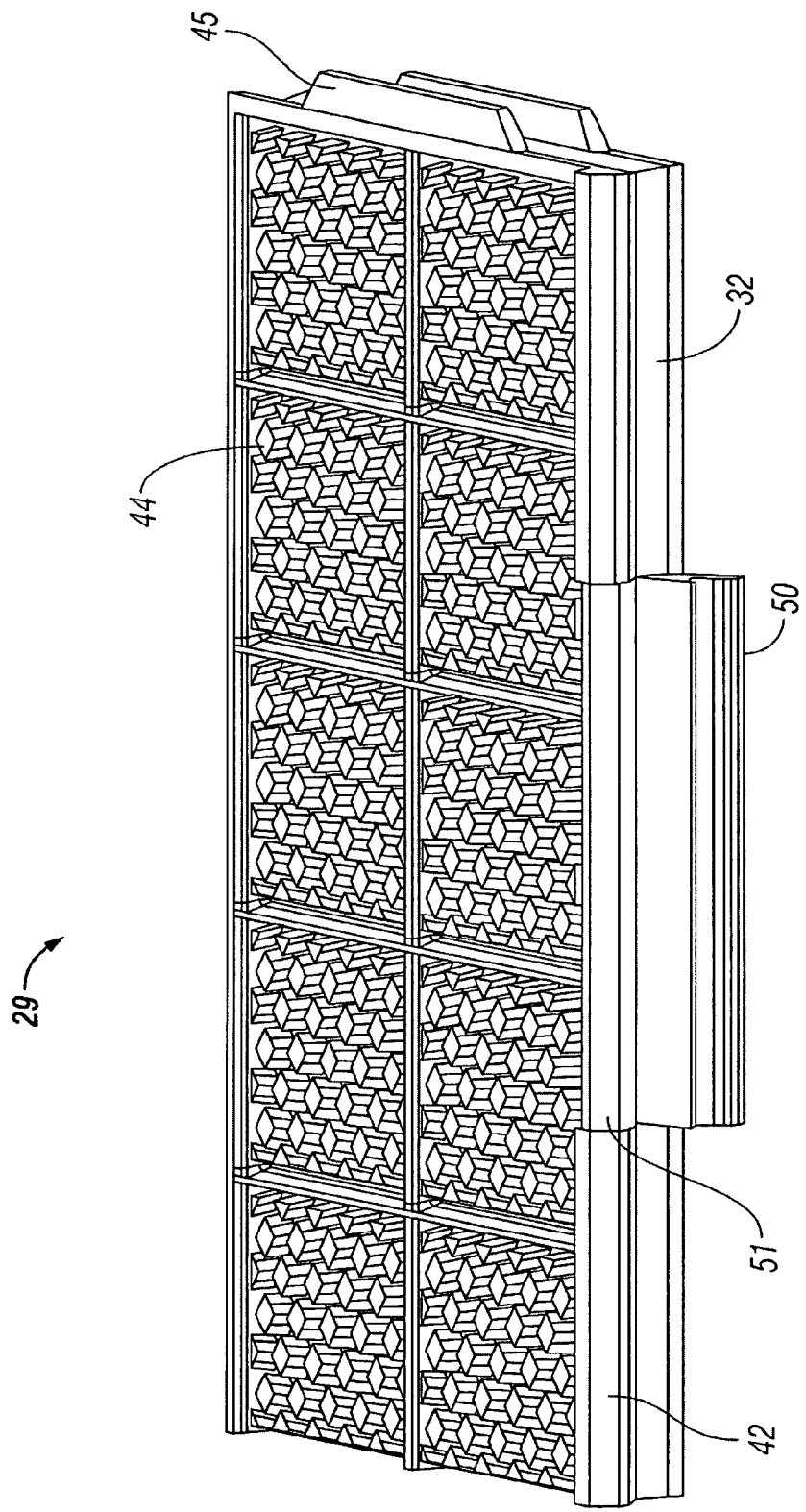
FIG. 18 is a perspective view of an apparatus according to the present disclosure, shown in the "inside out" position, an optional configuration suited for stacking.
Figure 19:
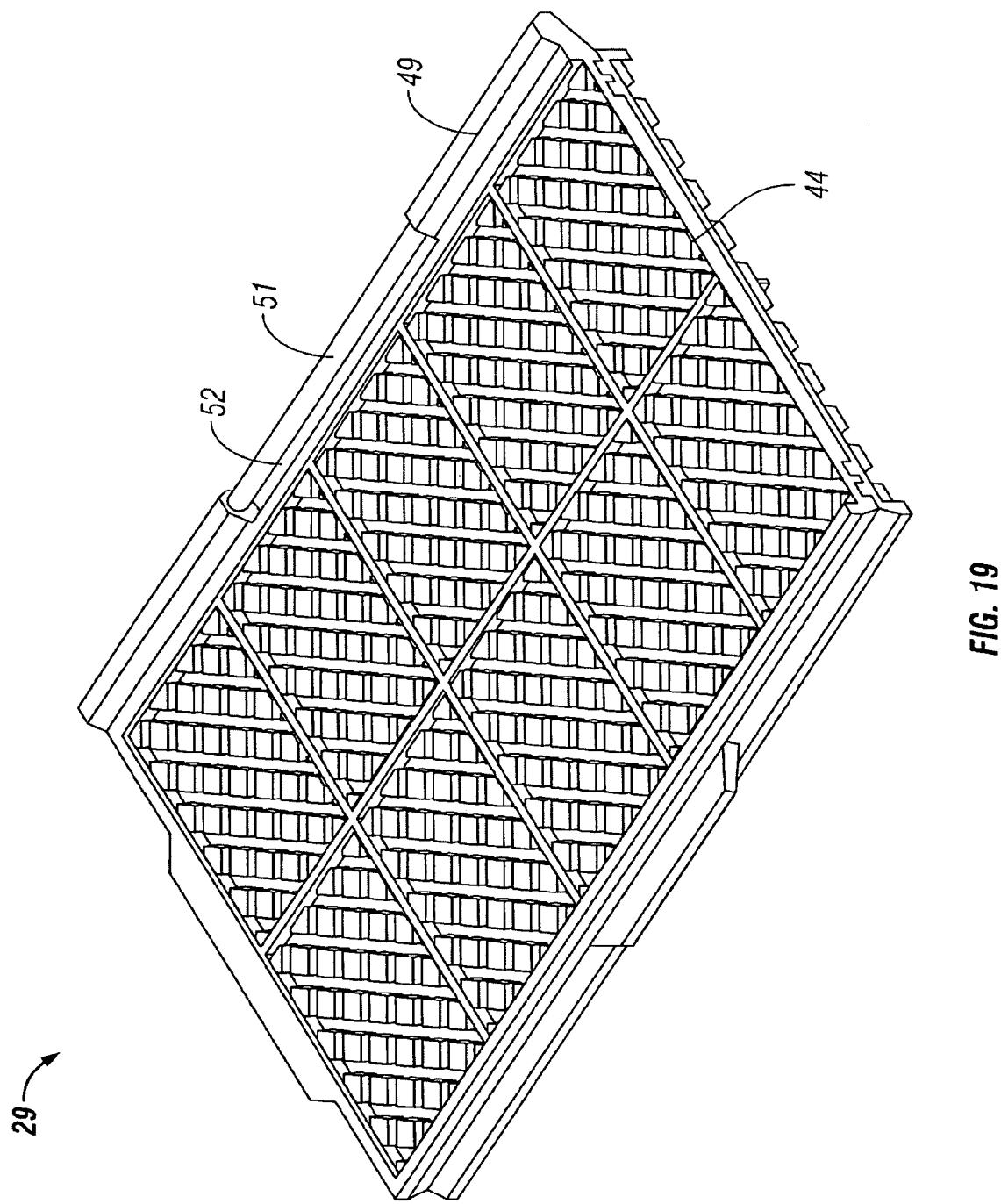
FIG. 19 is a perspective view from the right and above, of an apparatus according to the present invention, shown in the "inside out" position, suited for stacking.
Figure 20:
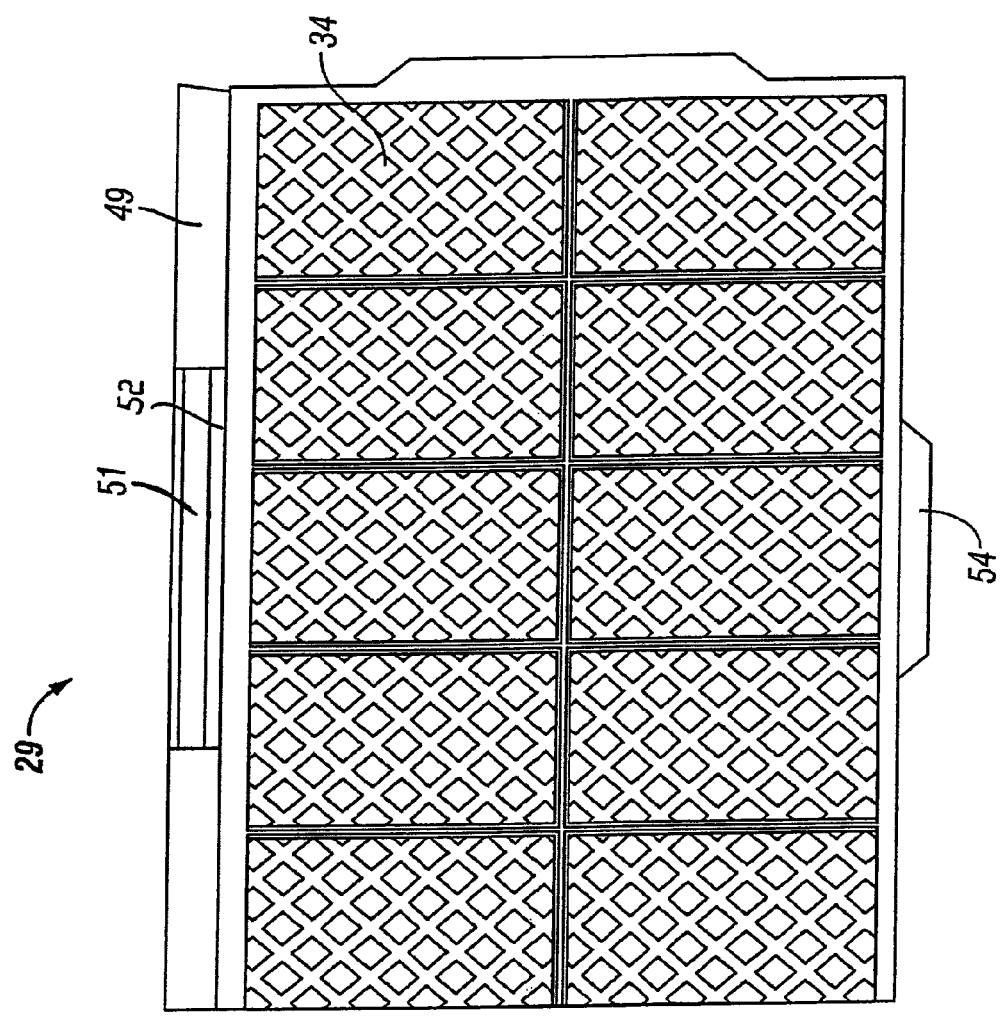
FIG. 20 is a top plan view of the apparatus seen in FIGS. 18 and 19.
Figure 21:
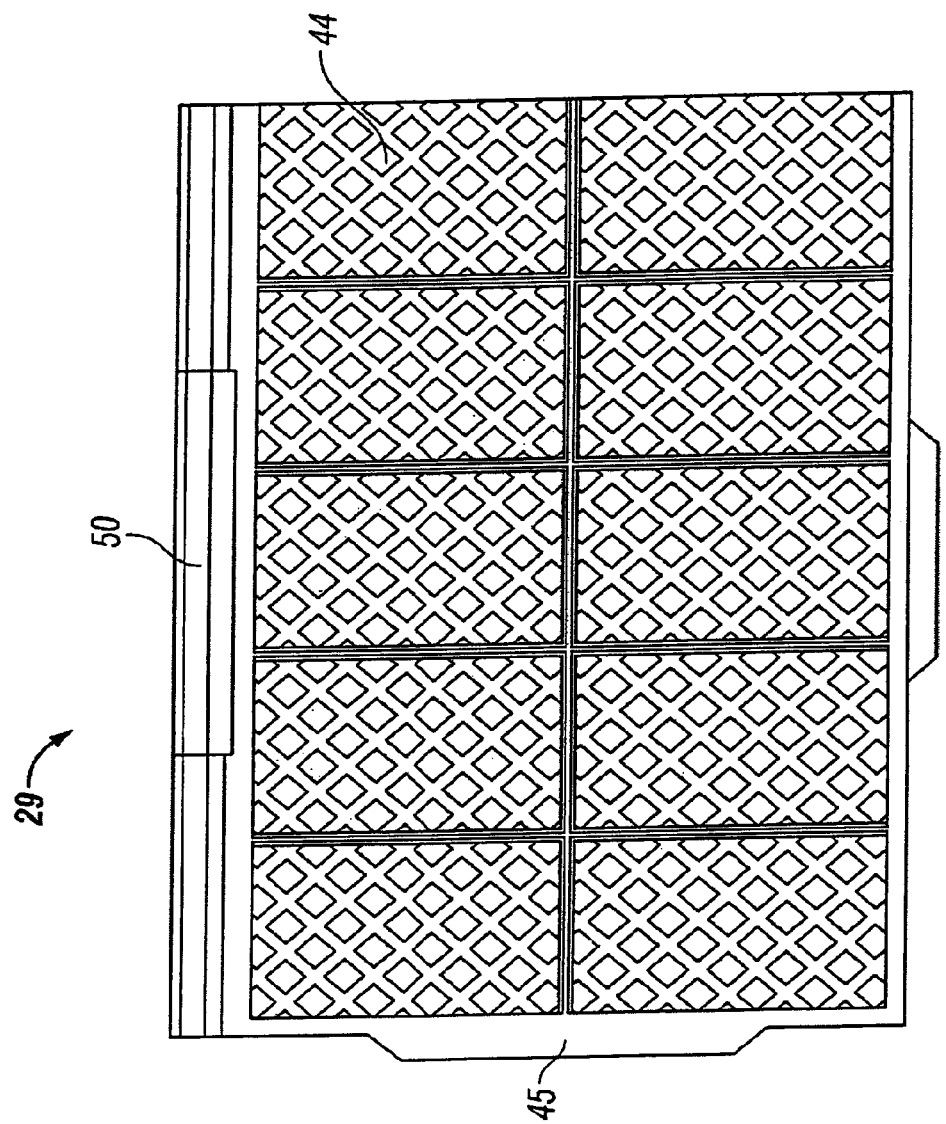
FIG. 21 is a bottom view of the apparatus seen in FIGS. 18 and 19.

As best seen in FIGS. 3-7, 9-13, 15, and 16, the housing 32 of the first gridiron assembly 30 has small cleats or cleats 56 projecting slightly therefrom. The cleats 56 preferably but not necessarily are provided in groups of three cleats situated at or about each outside corner of the housing 32, as shown in FIGS. 9 and 15, for example. The cleats 56 are molded integrally with the housing 32, or are fixedly secured thereto. Cleats 56 facilitate stable stacking of the assemblies 30, 40 as further described.

Figure 7:
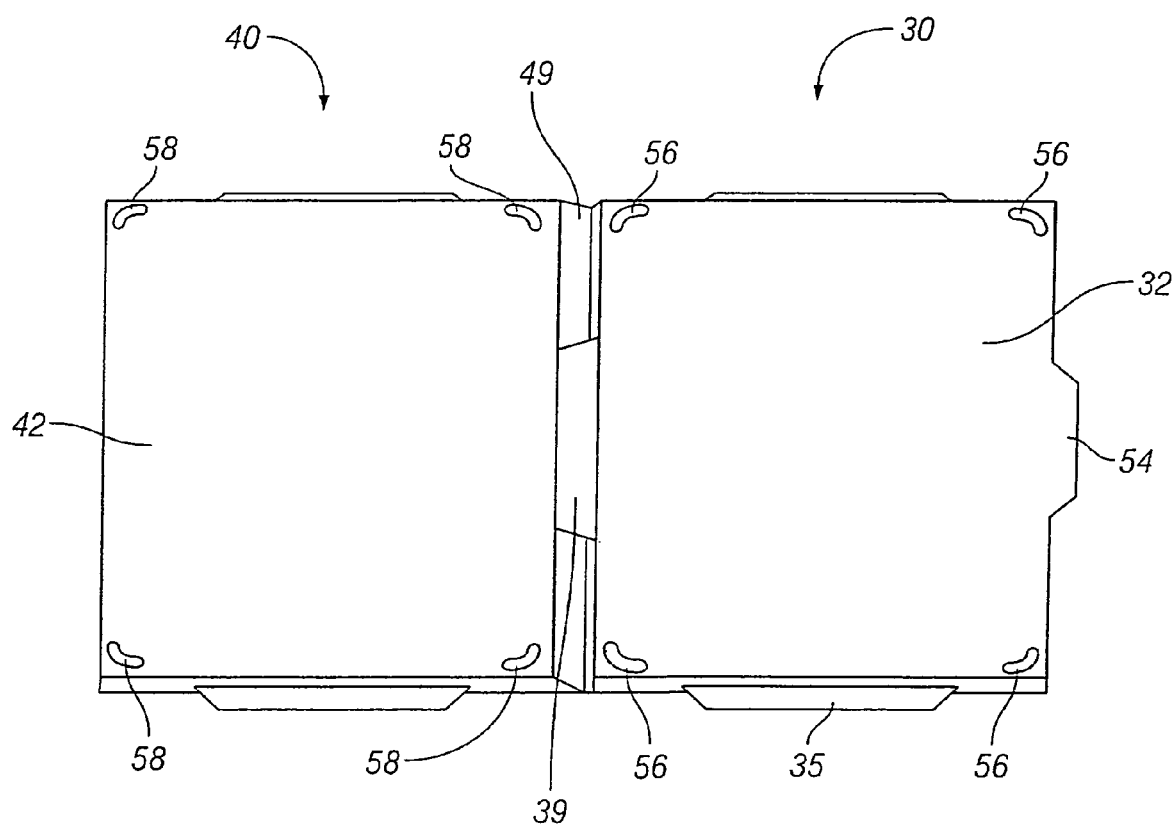
FIG. 7 is a bottom view of the apparatus seen in FIGS. 1 and 2.
Figure 8:
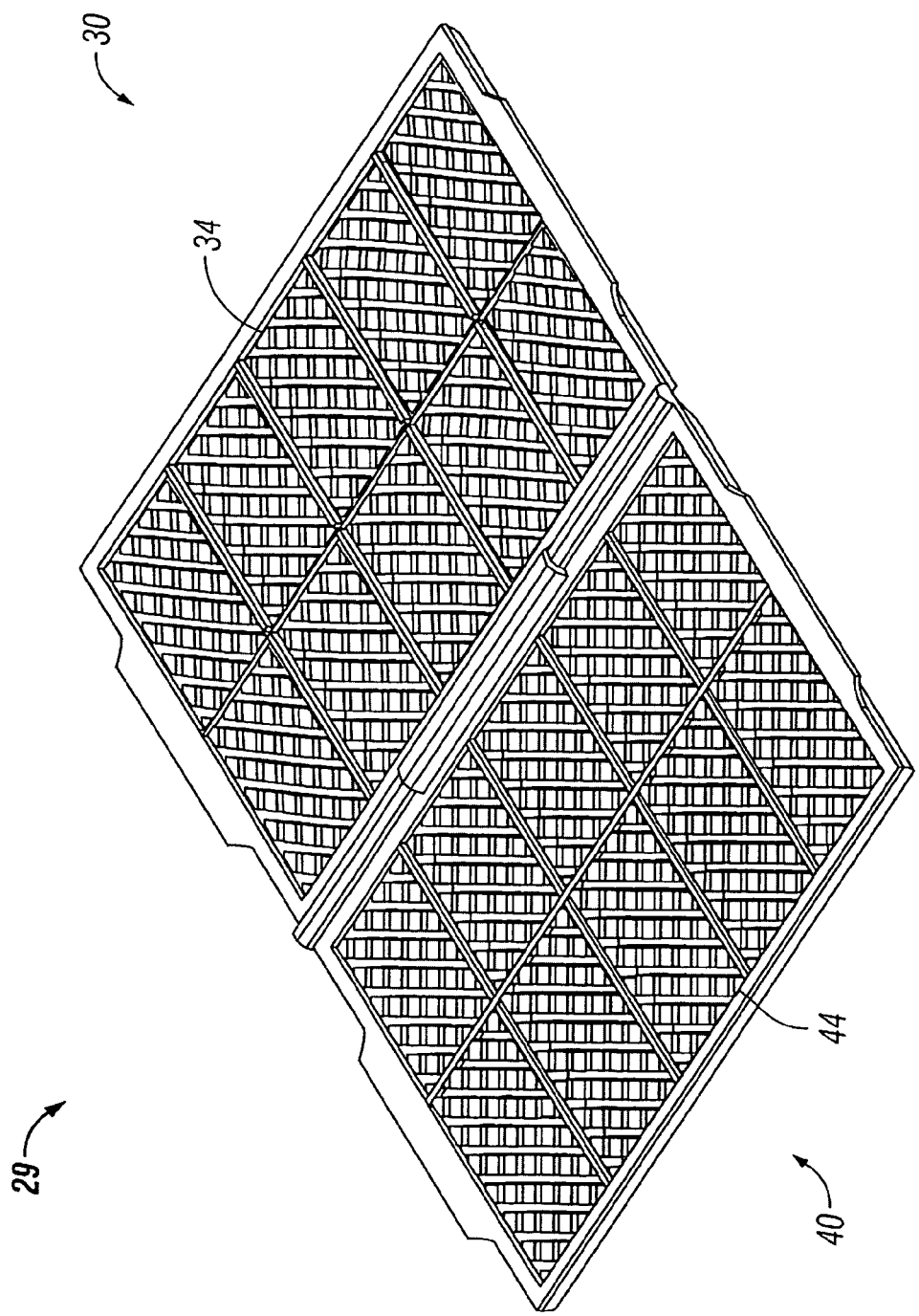
FIG. 8 is a right side perspective view of an apparatus according to the present disclosure, shown from above and in an open position.
Figure 14:
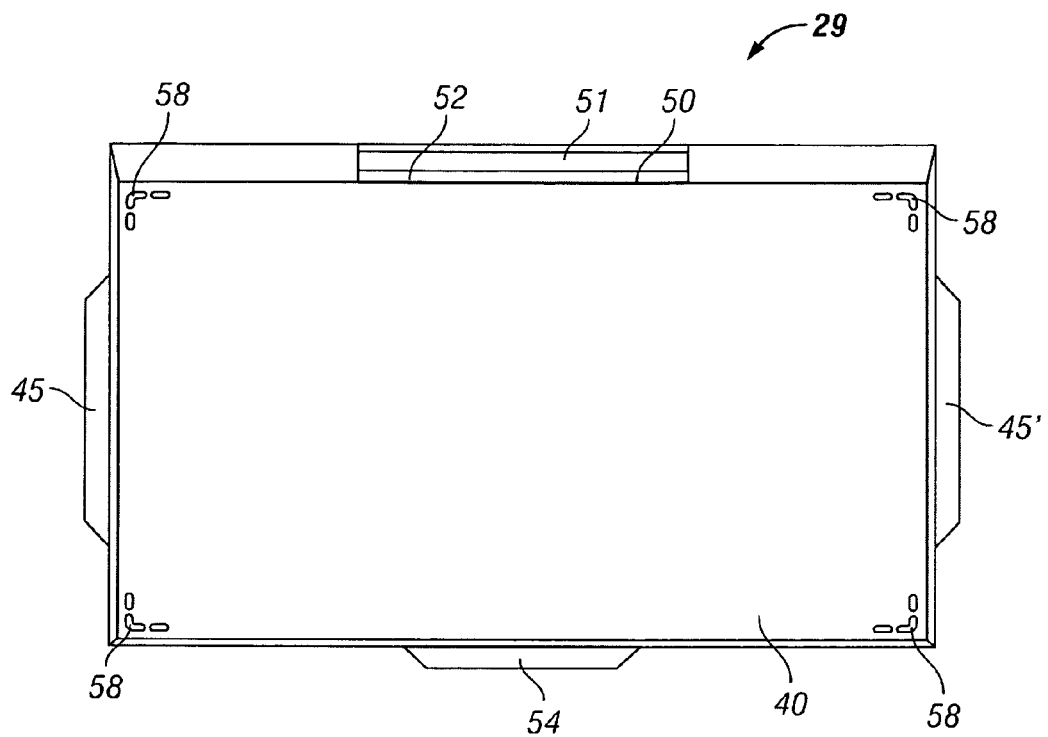
FIG. 14 is a bottom view of the apparatus seen in FIGS. 9 and 10.
Figure 23:
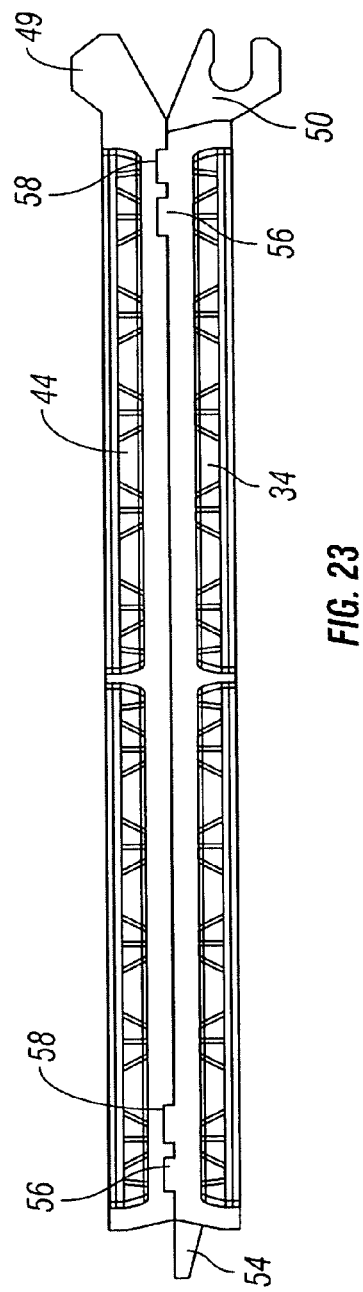
FIG. 23 is a right side sectional view of the apparatus seen in FIGS. 18 and 19.
Figure 26:
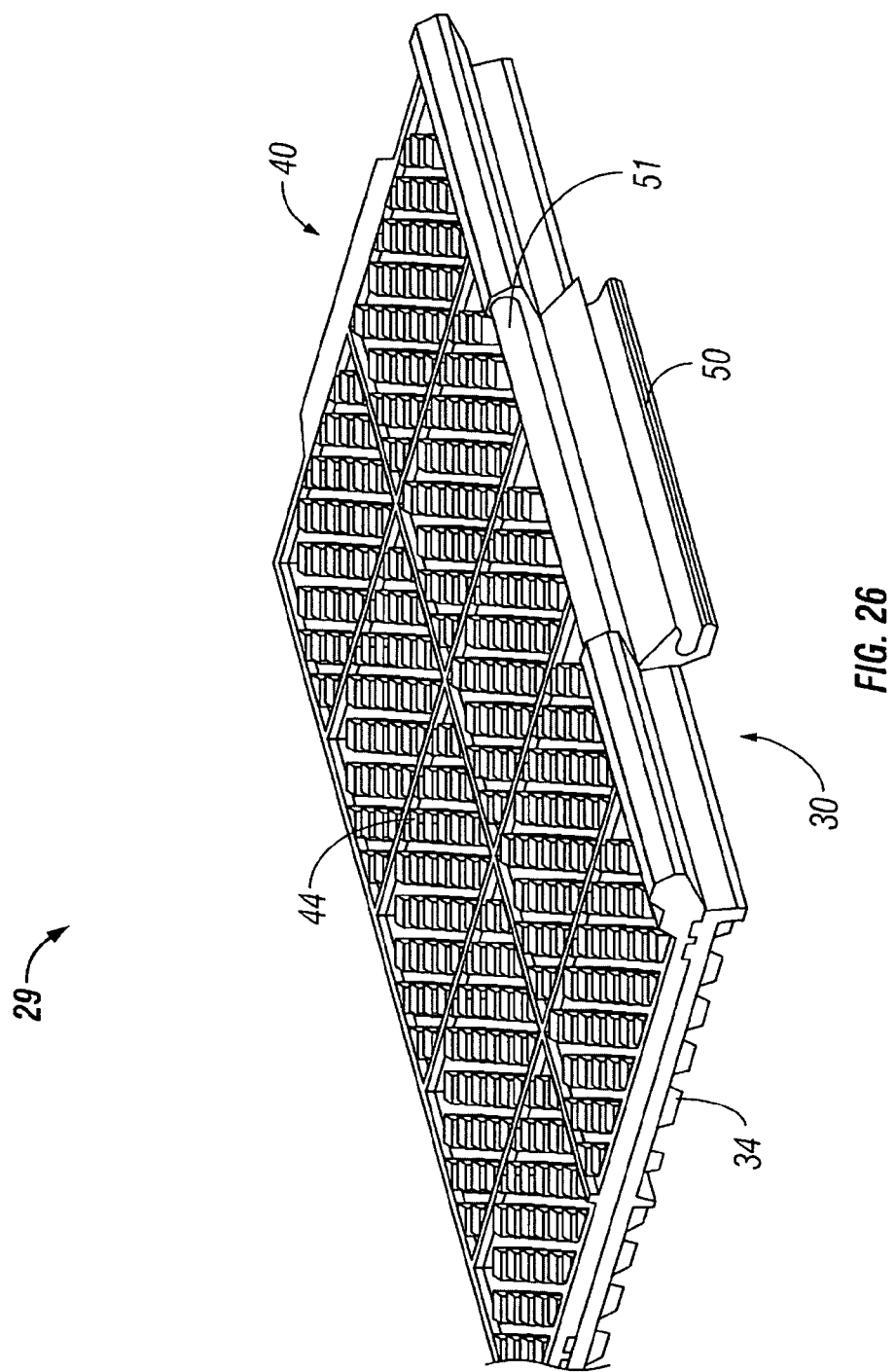
FIG. 26 is a perspective view of the right side rear corner of the apparatus seen in FIGS. 18 and 19.

As seen in FIGS. 7, 14, and 23, the second housing 42 of the second gridiron assembly 40 has small dimples or indents defined therein. Like the cleats 56, the indents 58 preferably are manifest in groups of three, situated at or about each outside corner of the second housing 42, as shown for example in FIG. 14. Alternatively, each indent may be a single concavity, for example as illustrated in FIG. 7, devised to receive and engage one or more cleats. In all embodiments, the effective sizes, contours, and locations of the indents 58 are complementary to and correspond with the sizes, contours; and locations of the cleats 56, the latter being convex and the indents being "concave" into the second housing 42. It is seen therefore, and perhaps as best shown in FIG. 23, that when the assemblies 30, 40 are inverted and brought together into an "inside out" configuration, the cleats 56 on the one housing 32 are releasably engageable into and with corresponding ones of the indents 58 in the second housing 42.

FIGS. 1-8 show the apparatus 29 in the open position, with the knuckle elements 39, 49 mutually pivotally engaged. A dollop of waffle batter (or other food item to be baked or grilled) can be deposited upon either gridiron, preferably the second gridiron 44, for cooking. The first gridiron assembly 30 may then be pivoted to the closed position, as depicted in FIGS. 9-17; the batter or other food item is compressed between the gridiron surfaces 34, 44 for baking. According to the present invention, one or more apparatuses 29 thus filled with batter and then moved into the closed position, are placed into a kitchen oven for baking at a known predetermined temperature and baking time.

Accordingly, there has been disclosed an apparatus 29 for baking simultaneously a plurality, for example eight or more, of waffles. The apparatus features the first gridiron assembly 30 having the curved flange 50 and defining at least eight waffle forms 36 thereon. The associated second gridiron assembly 40 includes the rod 51 and slot 52, and defines waffle forms 46 thereon corresponding in number to the waffle forms 36 in the first gridiron assembly 30. The curved flange 50 is engageable through the slot 52 and around the rod 51 to hingeably connect the first gridiron assembly 30 to the second gridiron assembly 40, whereby the first gridiron assembly is pivotable into a closed position in parallel adjacency with the second gridiron assembly (FIGS. 9-17). The first gridiron assembly 30 also is pivotable into an open position (FIGS. 1-8) in which the curved flange 50 is disengeable from around the rod 51 to disconnect the gridiron assemblies 30, 40 from one another.

Figure 27:
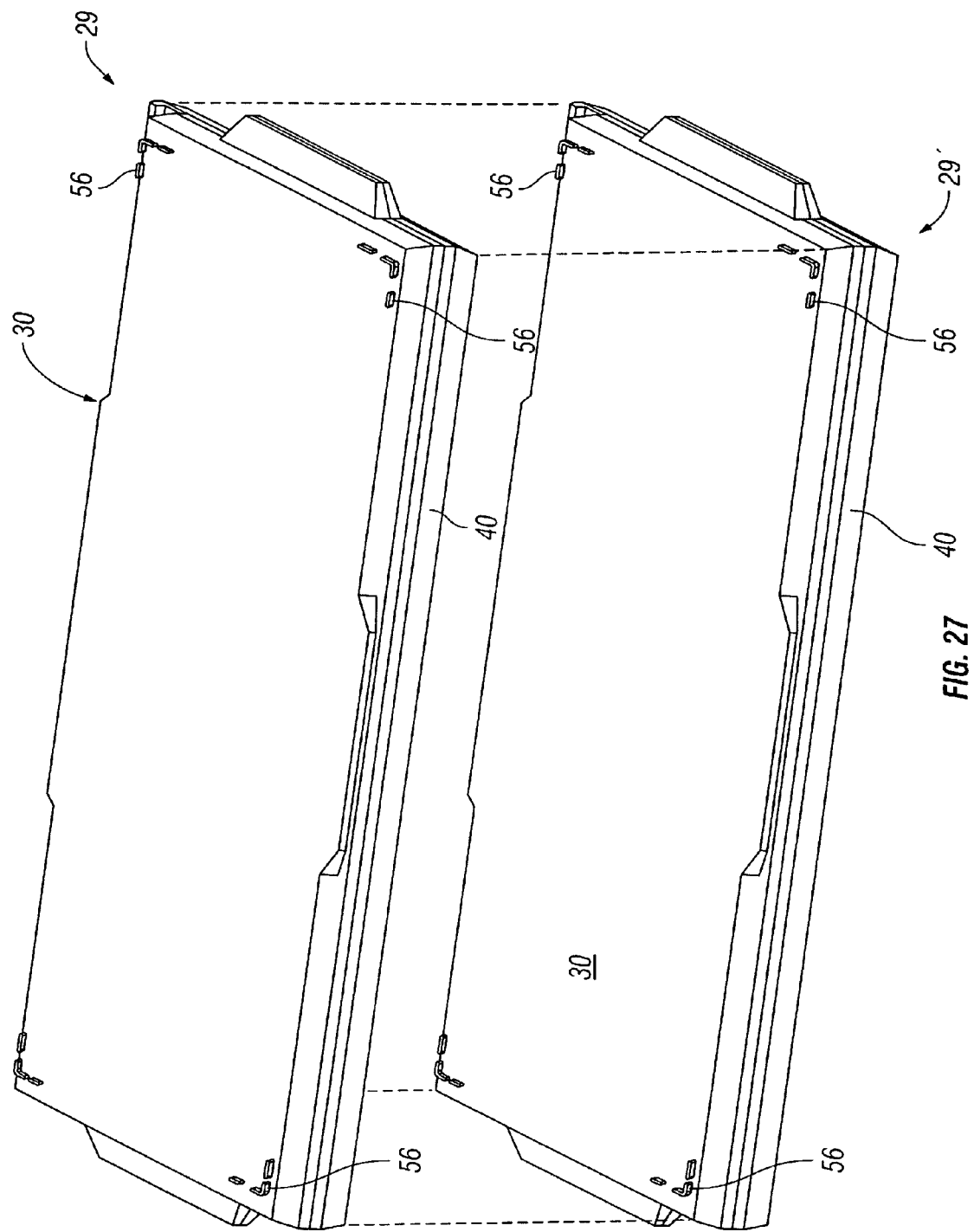
FIG. 27 is a perspective view from above, illustrating the stackability of two apparatuses according to the present disclosure.
Figure 28:
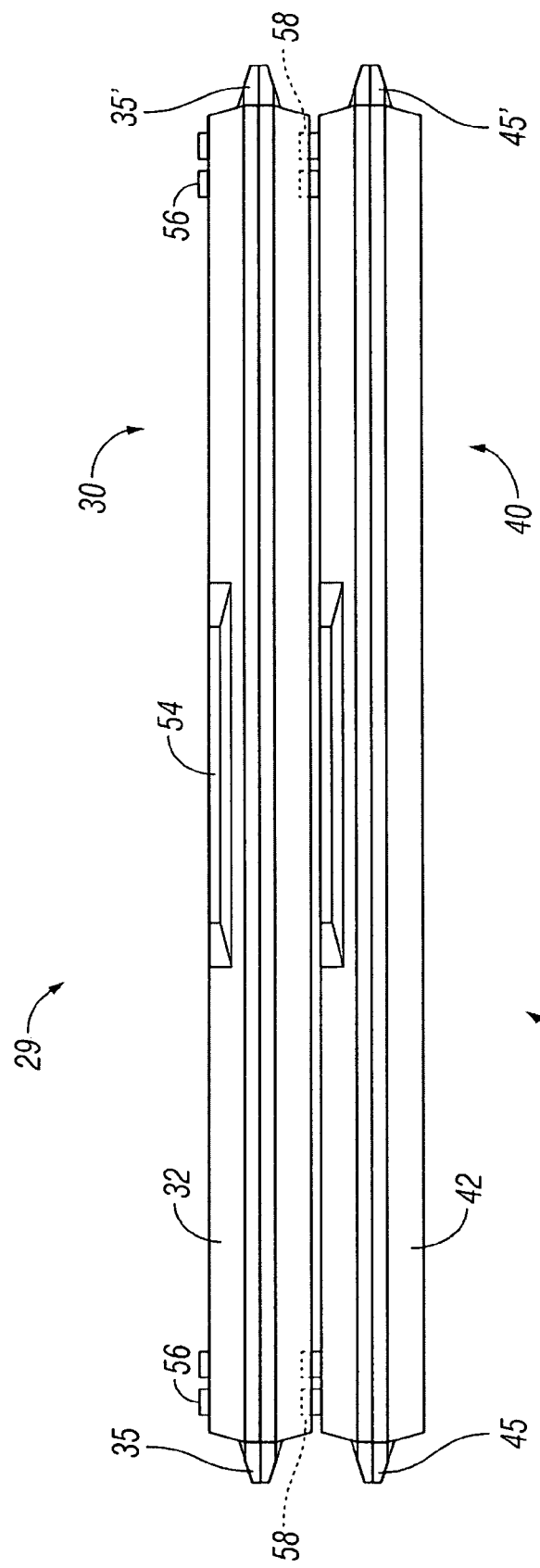
FIG. 28 is a front view of a pair of apparatuses stacked one atop another according to one advantage of the present disclosure.
Figure 29:
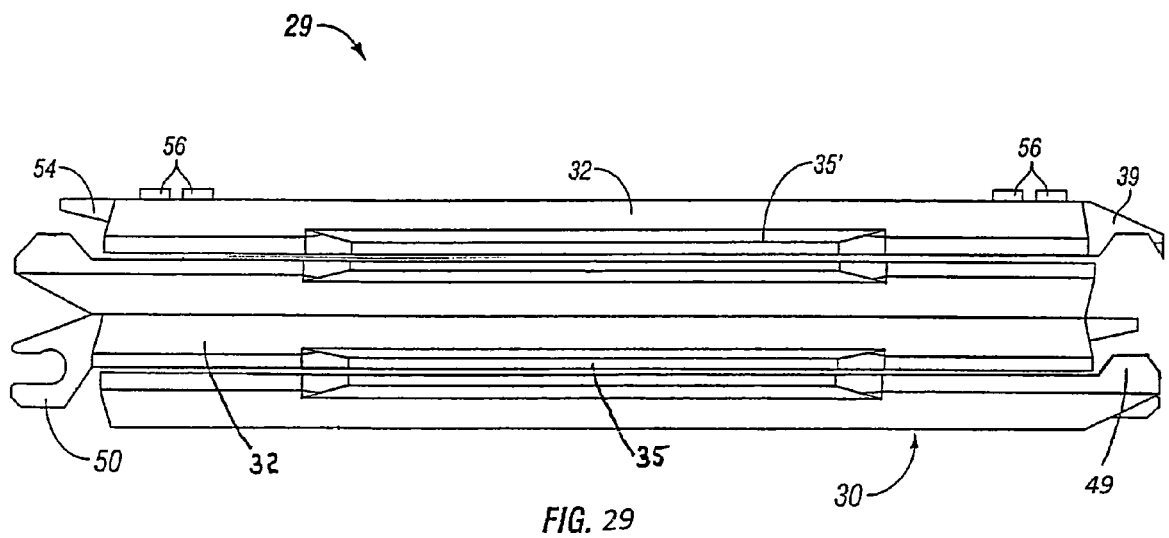
FIG. 29 is a left side view of a pair of apparatuses, one apparatus in an "inside-out" condition and disposed between the gridiron assemblies of the other apparatus, according to another advantage of the present disclosure.

As mentioned, the first and second gridiron assemblies 30, 40 each has a housing 32, 42. A plurality of cleats 56 project from a surface of the housing 32 of the first gridiron assembly 30, while a plurality of indents 58 are defined in a surface of the housing 42 of the second gridiron assembly 40. As best seen in FIGS. 27 and 28, the cleats 56 of a first gridiron assembly 30 are alignable with, and engageable into, the indents 58 of a second gridiron assembly 40.

Continued reference to the drawing figures, especially FIGS. 27 and 28, shows how pair of apparatuses 29, 29' is stably stackable vertically. The cleats 56 of a first gridiron assembly 30 of a lower first one of the apparatuses 29 are engageable with corresponding indents 58 of a second gridiron assembly 40 of a second one of the apparatuses 29'. The cleats 56 preferably but not necessarily are disposed at corner locations of the housing of a first gridiron assembly 30, while the indents 58 are located at corresponding corner locations of the housing of a second gridiron assembly 40. With the cleats and indents of two or more apparatuses so inter-engaged, apparatuses according to the invention can be disposed in stable, neat, vertical stacks, especially for storage when not in use.

Apparent from the foregoing is a method for baking simultaneously a plurality of waffles. The method includes providing a first gridiron assembly 30 having the curved flange 50 thereon, defining at least eight waffle forms 36 in the first gridiron assembly, providing a second gridiron assembly 40 with the hinge rod 51 and slot 52 thereon, and defining in the second gridiron assembly some waffle forms 46 corresponding in sizes and number to the waffle forms 36 in the first gridiron assembly 30. The method also includes engaging the curved flange 50 through the slot 52 and around the rod 51 to hingeably connect the first gridiron assembly to the second gridiron assembly. A waffle batter can then be disposed on either gridiron assembly, and the continuing process then moves to pivoting the first gridiron assembly 30 into parallel adjacency with the second gridiron assembly 40 thereby to press the batter between the assemblies. The gridiron assemblies in this closed position are then placed into a residential kitchen oven for baking the batter.

A preferred method includes the added steps of inter-engaging at least two pairs of gridiron assemblies (FIGS. 27, 28) and placing substantially simultaneously the pairs into the residential kitchen oven. After the waffles are baked and removed from the apparatus, the method may further include pivoting the pairs of gridiron assemblies out of parallel adjacency, disengaging the curved flanges from around the rods to disconnect the first gridiron assemblies from the second gridiron assemblies, and separating the assemblies for washing.

FIGS. 18-26 show how the apparatus 29 optionally and alternatively may be reconfigured for stacked use or storage. The assemblies 30, 40 as described previously herein may be pivoted to the open position, so that the hinged connection between them is released and the assemblies separated. Separated from each other, the gridiron assemblies 30, 40 are mutually reversed in disposition, that is, they are both turned "upside down" from their more conventional positions (e.g. as seen in FIGS. 9-17). In the inside-out stacking configuration, the housings 32, 42 are brought into flush confronting relation, with the cleats 56 inserted into corresponding indents 58. Engagement of the cleats 56 with the indents 58 promotes a releasable connection between the assemblies 30, 40, to prevent them from sliding past each other. (The hinge knuckle elements 39, 49 no longer being mutually engaged, but rather adjacent but detached as seen for example in FIG. 18.) All so positioned for stacking, as seen in FIGS. 18-26, a plurality of two or more apparatus 29 can be stacked one on top the other in a relatively smaller volume for storage.

Alternatively and importantly, the apparatus 29 as configured in the stacked condition also can be used in baking. The inside-out apparatus 29 as seen in FIGS. 18-26 can be "sandwiched" between a second gridiron assembly 40 and a first gridiron assembly 30 that are unhinged, but otherwise normally positioned in "closed" condition. Thus, a stack of two apparatus 29 may be stacked; a second assembly 40 resting on a table or countertop with its gridiron 44 facing upward, a pair of assemblies 30, 40 configured inside out as seen in FIGS. 18-26 upon the bottom second assembly, and then a first assembly 30 resting upon the top of the stack with its gridiron surface 34 in confronting relation with the upturned gridiron surface 44 of the medial "sandwiched" apparatus. Using such a multi-stack of two apparatus 29, two waffles can be prepared at one time.

The gridiron assemblies can be heated by placing the apparatus 29 in a hot oven for the requisite time and temperature for the food item being prepared. Further, the apparatus 29 can be heated while in the inside-out configuration and "sandwiched" within a second pair of assemblies 30, 40 as described above, for placement in an oven.

Multiple apparatus 29 configured in the collapsed configuration as seen in FIGS. 18-26 can be stored one on top of the other, or one next to the other, in a relatively compact space. Withdrawn from storage, the assemblies 30, 40 can be flipped and reversed into position for use, as suggested by FIGS. 1-17.

Figure 22:
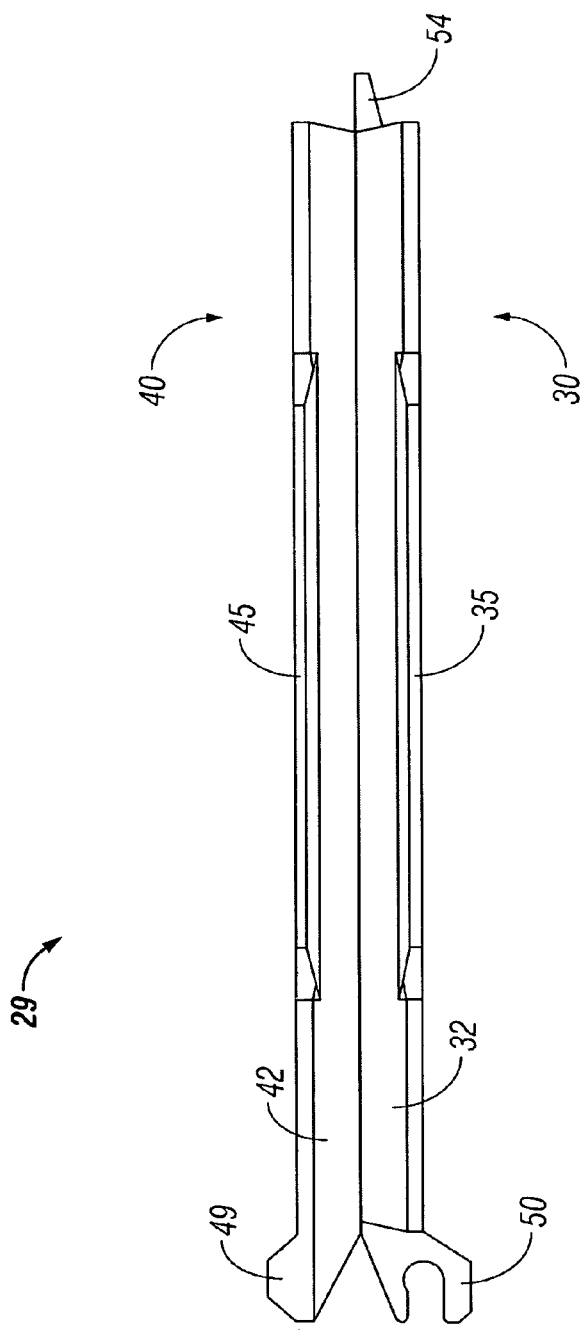
FIG. 22 is a left side elevation view of the apparatus seen in FIGS. 18 and 19.

As best illustrated by FIGS. 22-26, when an apparatus 29 is manipulated to or past the "open" position, the curved flange 50 is fully disengaged from the knuckle element 49 containing the hinge rod 51 and slot 52. In the apparatus positioned as depicted in FIGS. 22-23, for example, the first and second gridiron assemblies 30, 40 can be pulled apart and fully separated physically for washing.

Also, it is seen (FIGS. 27, 28) that the cleats 56 and indents 58 can be used to stack multiples of the apparatus 29 when the apparatus is in the closed position. As seen in FIG. 28, the cleats 56 of one apparatus 29 can be aligned with and inserted into the corresponding indents 58 of a second apparatus, so that the two apparatuses are stably stacked vertically. Several apparatuses can be stacked in a tidy pile, with the engagement of cleats with indents preventing lateral sliding of one apparatus relative to a vertically adjacent one, stabilizing the stack for storage.

A significant advantage of the method and apparatus is that waffles are generated concurrently in relatively large quantities. A single apparatus 29 can be employed to produce eight, or ten, or more waffles at a single instant, for immediate consumption by a group. The simultaneous use of two or more apparatuses 29 in a single kitchen oven allows the homemaker user to bake even more waffles, all of which can be taken from the oven at one time, removed immediately from the apparatuses, and presented at the meal table for eating while still hot and crisp. Thus, the conventional routine, common with families and other groups using ordinary electric waffle irons, whereby waffles are baked a few at a time, is avoided. Many families are familiar with less than desirable situation in which one or two persons are eating hot waffles while one or two others wait for the next "round" of two or four waffles to finish baking. Alternatively, the homemaker bakes over a period of many minutes a series of waffles, and simply piles them on a platter to cool and grow soggy until a sufficient number of waffles has accumulated on the platter to be served all at once to the group of breakfast eaters.

By the practice of the present invention, many hot, crisp, waffles emerge from the inventive apparatus at a single instant, so that the food can be enjoyed by an entire group together; the need for individuals to await the serial production of hot waffles is eliminated.

Also, the apparatus is easily cleaned. Inasmuch as the apparatus does not include electrical heating elements therein, it is fully submersible in a dishwashing sink for washing. Further, the two gridiron assemblies 30, 40 are readily detachable and can be completely separated for cleaning.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

I claim:

1. A pair of apparatuses for baking waffles, wherein each of a first and a second apparatus comprises:
    a first gridiron assembly comprising a curved flange and coupled with a first waffle-textured gridiron defining a plurality of waffle forms thereon;
    a second gridiron assembly comprising a rod and slot, and coupled with a second waffle-textured gridiron defining waffle forms thereon corresponding in number to the waffle forms in the first gridiron assembly;
    wherein the first and second gridiron assemblies each comprises a housing, and further comprising:
        a plurality of cleats projecting from an outer surface of the housing of the first gridiron assembly; and
        a plurality of indents in an outer surface of the housing of the second gridiron assembly;
    wherein the cleats of the first gridiron assembly are alignable with and engageable into the indents of the second gridiron assembly;
    wherein the curved flange is engageable through the slot and around the rod to hingeably connect the first gridiron assembly to the second gridiron assembly, whereby the first gridiron assembly is pivotable into a closed position in parallel adjacency with the second gridiron assembly;
    further wherein the first gridiron assembly also is pivotable into an open position in which the curved flange is disengageable from around the rod to disconnect the gridiron assemblies from each another; and
    further wherein when both of the first gridiron assemblies of the pair of apparatuses are in the closed position, cleats of the first apparatus are engageable into indents of the second apparatus; and
    further wherein when both the first gridiron assemblies of the apparatuses are in the open position, the gridiron assemblies of each respective apparatus are mutually reversible into an inside-out configuration to bring their respective housings into flush confronting relation, with the cleats of a first housing of the first apparatus inserted into corresponding indents of a second housing of the first apparatus, and with the cleats of a first housing of the second apparatus inserted into corresponding indents of a second housing of the second apparatus, whereby the waffle-textured gridiron of the first apparatus is disposable against the waffle-textured gridiron of the second apparatus, thereby to stack the first apparatus on the second apparatus.

2. An apparatus according to claim 1 wherein the cleats are disposed at corner locations of the housing of each first gridiron assembly, and the indents are located at corresponding corner locations of the housing of each second gridiron assembly.

3. A pair of apparatuses for baking waffles, wherein each of a first and a second apparatus comprises:
- a first gridiron assembly comprising a curved flange and coupled with a first waffle-textured gridiron defining a plurality of waffle forms thereon;
- a second gridiron assembly comprising a rod and slot, and coupled with a second waffle-textured gridiron defining waffle forms thereon corresponding in number to the waffle forms in the first gridiron assembly;
- wherein the first and second gridiron assemblies each comprises a housing, and further comprising:
  - a plurality of cleats projecting from an outer surface of the housing of the first gridiron assembly; and
  - a plurality of indents in an outer surface of the housing of the second gridiron assembly;
- wherein the cleats of the first gridiron assembly are alignable with and engageable into the indents of the second gridiron assembly;
- wherein the curved flange is engageable through the slot and around the rod to hingeably connect the first gridiron assembly to the second gridiron assembly, whereby the first gridiron assembly is pivotable into a closed position in parallel adjacency with the second gridiron assembly;
- further wherein the first gridiron assembly also is pivotable into an open position in which the curved flange is disengageable from around the rod to disconnect the gridiron assemblies from each another; and
- further wherein when both the first gridiron assemblies of the apparatuses are in the open position:
  - the gridiron assemblies of the first apparatus are mutually reversible into an inside-out configuration to bring the housings of the first apparatus into flush confronting relation, with the cleats of a first housing of the first apparatus engaged with corresponding indents of a second housing of the first apparatus; and
  - the first apparatus when in the inside-out configuration is disposable between the gridiron assemblies of the second apparatus, whereby the waffle-textured gridiron of the first gridiron assembly of the second apparatus is disposable against the waffle-textured gridiron of the first gridiron of the first apparatus, and the waffle-textured gridiron of the second gridiron assembly of the second apparatus is disposable against the waffle-textured gridiron of the second gridiron assembly of the first apparatus.

* * * * *